Patented Apr. 11, 1944

2,346,497

UNITED STATES PATENT OFFICE 2,346,497

SOLUTIZER PROCESS

Lawrence L. Lovell, Wood River, Arthur E. Martin, East Alton, and Francis W. Bell, Alton, Ill., assignors to Shell Development Company, San Francisco, Calif., a corporation of Delaware No Drawing. Application September 2, 1941, Serial No. 409,270

5 Claims. (Cl. 196—30)

This invention relates to the art of refining hydrocarbons by extraction with so-called solutizer solutions, and more particularly to an improved solutizer process. Specifically it is concerned with an improved method of treating hydrocarbon distillate with alkaline solutions containing solutizers in the absence of free oxygen or oxidation products of hydrocarbon oils.

The solutizer process, by means of which mercaptans and other weak organic acids contained in sour hydrocarbon distillates, and more particularly in gasoline distillates, are extracted with solutizer solution, i. e. aqueous solutions of alkali metal hydroxides containing solutizers, is well known. Suitable solutizers are for example: aliphatic alkanolamines and amino alkylamines, in which the alkylene radicals contain 2 to 3 carbon atoms; diamino alcohols, glycols and amino glycols of 3 to 5 carbon atoms; alkyl glycerines in which the number of carbon atoms in the alkyl radical is from 1 to 4; mono alkyl ethers of glycerine in which the alkyl radical has from 1 to 3 carbon atoms; diamino, dihydroxy, or amino hydroxy alkyl ethers, thioethers or imino ethers in which the alkyl radicals have from 2 to 3 carbon atoms; alkali and particularly potassium salts of fatty acids having from 1 to 6 carbon atoms, or of amino or hydroxy fatty acids having from 3 to 7 carbon atoms, or of phenyl acetic acid, or of dicarboxylic acids having from 5 to 11 carbon atoms in which the carboxyl radicals are separated by at least two carbon atoms, or of phenols or alkyl phenols; mixtures of the above and particularly mixtures with gum inhibitors soluble in aqueous caustic alkali solutions. The solutizer process has been described and the several compounds particularly suitable as solutizers have been enumerated in a series of patents and patent applications, as well as in the general literature, for example, in the Yabroff et al. U. S. patents, 2,149,379, 2,149,380, 2,152,720, 2,152,723, 2,164,851, 2,186,398, 2,202,039, 2,223,798, 2,229,995; Refiner and Natural Gasoline Manufacturer, May 1939, pages 171 to 176 and March 1940, pages 73 to 76; Industrial and Engineering Chemistry, vol. 32, pages 257 to 262, February, 1940; Chemical and Metallurgical Engineering, vol. 47, pages 776 to 778, November 1940; Oil and Gas Journal, vol. 39, No. 26, pages 55 to 56, November 7, 1940, etc. As shown in these references, the solutizer process involves the extraction of mercaptans whereby a spent solutizer solution is produced which is continuously regenerated as by steam stripping, and the regenerated solution is then reused for further extracting mercaptans. The main purpose of the process is to sweeten sour gasoline distillates.

It has been observed that in the course of such treatment, hydrocarbon distillates, e. g. gasoline, may deteriorate in color, and the solutizer solutions, i. e. alkali metal hydroxide solutions containing solutizers, sometimes tend to form relatively stable emulsions with the hydrocarbon oil under treatment, probably due to gradual accumulation of emulsifiers believed to be resinous substances not removable by steam stripping, which emulsions either reduce the throughput due to retarded settling or cause carry-over of valuable solutizer.

The exact source and chemical composition of the emulsifier and color-forming bodies were not known heretofore. The emulsifiers appear to be gummy materials of a resinous nature. The color bodies apparently are of several kinds: they may be resinous emulsifiers, or resinous substances having no emulsifying properties, or substances which may be isolated in crystalline form.

The object of this invention is to facilitate the treatment of hydrocarbon distillates by means of solutilizer solutions. Another purpose is to decrease the cost of operation in solutizer plants by minimizing or preventing losses of valuable solutizer which are suffered when contaminated solutions must be discarded. Still another purpose is to prevent accumulation of emulsifiers and substances causing color deterioration of the gasoline. A more particular purpose is to provide an improved solutizer process whereby the above difficulties may be obviated.

We have discovered that the troublesome substances, emulsifiers as well as the color bodies, are formed through oxidation, probably of some components contained in the hydrocarbon oil to be treated. The oxidation to the troublesome substances may take place before the oil comes in contact with the solutizer solution, or may take place within the treating system or both. Components of the oil at least in part responsible for the difficulties are known as "gum-forming" compounds. As is well known, cracked gasolines in particular are apt to contain considerable quantities of them. Oxygen gums in gasoline distillates, i. e. gums formed through oxidation of gum-forming components, have, among other substances, been definitely proven to cause emulsification. Possibly certain solutizers, such as alkyl phenolates, may enter into the reaction, although it is believed that the solutizer solution acts principally as a catalyst, promulgating the oxidation of the gum-forming components in the hydrocarbon oil to compounds most of which are colored and many of which are acidic.

As is known in the course of the formation of oxygen gum, intermediate products such as peroxides, aldehydes, ketones, peraldehydes, acids, peracids, etc., are formed. The term oxygen gum as herein used is intended to include these intermediate products.

Our invention comprises carrying out the solutizer process in the presence of a minimum practical amount, and preferably in the total absence of free oxygen or oxygen gums or both, whereby the formation and accumulation of resinous emulsifiers and color bodies are to a great extent lessened or entirely prevented, thus forestalling the formation of troublesome emulsions, preventing deterioration in the color of the oil undergoing treatment, and facilitating the smoother operation of a solutizer plant.

This may be accomplished in two ways, either by preventing the free oxygen from entering the system or by removing it after it has entered the system.

In general, there are only relatively small amounts of free oxygen, if any, to be found in the aqueous solutizer solution, due to the fact that the solution circulating system is not only entirely closed, allowing no contact with air at any point, but is also purged continuously by steam stripping.

The main source through which oxygen may enter the system is by way of the feed. When freshly distilled, hydrocarbon distillates contain very little free oxygen, if any, and are substantially free of gums. However, unless they are immediately treated after distillation, small amounts of oxygen may enter into them during transit through pipe lines and pumps, or during storage in intermediate tanks, or in the course of contact with aqueous pre-treating solutions which may contain oxygen. As soon as oxygen has entered, oxidation of gum-forming components sets in.

Free oxygen most often enters when hydrocarbon oils are stored for some time. To prevent this, we take all proper steps to solutizer treat as soon as possible after distillation. If intermediate storage cannot be avoided, it should be for as short a time as possible and should be carried out in an oxygen-free atmosphere. To aid in providing such an oxygen-free atmosphere in storage tanks, it will be found effective to replace fixed roofs with floating roofs, or to employ liquid seals, or to blanket the liquid with an inert gas such as nitrogen, fuel gas, etc.

Of necessity the distillate must pass through pipe transit lines, and in most instances pumps will also be employed. Particular attention should be paid to the inspection of look boxes, etc., where the distillate may come into contact with the air. The pumps should operate under substantial super atmospheric pressures.

If free oxygen is being introduced into the feed by aqueous pretreating solutions, such as aqueous alkaline solutions used for preremoving acids stronger than mercaptans, for example $H_2S$, phenols, thiophenols, naphthenic acids, lower fatty acids, etc., an economical method of keeping at least a portion of the oxygen out comprises deaerating the aqueous solution prior to treating the feed, for instance by boiling or passing an inert gas through it which is free from oxygen.

If, on the other hand, the free oxygen already is in the feed, it may be removed by various methods such as passing the feed through a vessel containing an oxygen-absorbing substance, e. g. alkali metals, phosphorus, alkaline solutions of cuprous oxide, sodium hydrosulfite, sodium pyrogallol, etc., under conditions substantially completely to remove the free oxygen from the hydrocarbon feed. Treatments with adsorbents such as decolorizing clays, silica gel., bauxite, activated carbon, may remove preformed gums and at least some of the oxygen. In extreme cases redistillation of the oil may become necessary.

The marked improvement obtainable by the use of our invention is illustrated in the following examples:

(1) In the course of operation in a solutizer plant it was noted that a treated cracked gasoline deteriorated in color, the average color of the gasoline feed being 21 Saybolt Universal and that of the treated gasoline only 15. A cone roof on an intermediate feed storage tank was replaced with a floating roof, and the color of the treated gasoline leaving the plant was raised to 19 Saybolt Universal.

(2) In another instance the tank was completely by-passed, cracked gasoline going directly from a reforming unit to the solutizer treatment. This expedient resulted in complete avoidance of any color drop.

(3) In the course of operation in a solutizer plant it had been found necessary, due to the formation of troublesome emulsions when gasoline and solutizer solution were mixed, to add a commercial de-emulsifier from time to time. Measures to exclude free oxygen from the feed, including the installation of floating roofs in place of cone roofs, the closer inspection of pumps, look boxes, etc., were then put in force. Following the changes, no additions of the de-emulsifier have been found necessary. This indicates that emulsifier was no longer being formed.

(4) In order to simulate accelerated storage conditions, a freshly distilled cracked gasoline was aerated under the following conditions. The gasoline was placed in a flask with a reflux condenser attached and boiled gently at about 75° C., while air was let in through a bubbler at the rate of about 100 cc. per minute for three and one-half hours. The aerated gasoline was then stirred with fresh non-emulsifying solution at a temperature of about 75° C., whereupon an emulsion was formed. The solutizer solution was separated and stirred with freshly distilled original cracked gasoline, and an emulsion was again formed, showing that the solutizer solution had accumulated emulsifier.

We claim as our invention:

1. In the process of removing mercaptans from sour normally liquid cracked hydrocarbons free from hydrogen sulfide and containing gum forming components, by extraction with a circulating alkali metal hydroxide solution containing an effective amount of a solutizer for mercaptans, whereby a spent solutizer solution is produced which is continuously regenerated and returned to said extraction, the improvement comprising distilling said sour hydrocarbons and immediately thereafter and without allowing contact with air, subjecting the resulting distillate which is free from oxygen and oxygen gum to said extraction.

2. In the process of removing mercaptans from sour normally liquid cracked hydrocarbons free from hydrogen sulfide and containing gum forming components, by extraction with a circulating alkali metal hydroxide solution containing an effective amount of a solutizer for mercaptans, whereby a spent solutizer solution is produced which is continuously regenerated and returned to said extraction, the improvement comprising distilling said sour hydrocarbons and without allowing contact with air, and subjecting the resulting distillate which is free from oxygen and oxygen gum to said extraction.

3. In the process of removing mercaptans from sour normally liquid hydrocarbons free from hydrogen sulfide and containing gum forming components and acids stronger than mercaptans, by extraction with a circulating alkali metal hydroxide solution containing an effective amount of a solutizer for mercaptans, whereby a spent solutizer solution is produced which is continuously regenerated and returned to said extraction, the improvement comprising distilling said hydrocarbons and without allowing contact with air, subjecting the resulting distillate which is free from oxygen and oxygen gum to a treatment with a deaerated alkaline aqueous solution to remove said stronger acids, and then further immediately contacting the resulting hydrocarbon distillate which is still free from oxygen and oxygen gum with said alkali metal hydroxide solution containing said solutizer.

4. In the process of removing mercaptans from sour normally liquid hydrocarbons free from hydrogen sulfide and oxygen, and containing gum forming components and acids stronger than mercaptans, by extraction with a circulating alkali metal hydroxide solution containing an effective amount of a solutizer for mercaptans, whereby a spent solutizer solution is produced which is continuously regenerated and returned to said extraction, the improvement comprising distilling said hydrocarbons and without allowing contact with air treating the resulting distillate with a deaerated aqueous alkaline solution to remove said stronger acids and then further immediately subjecting the resulting treated distillate which is free from oxygen and oxygen gum to said extraction.

5. In the process of removing mercaptans from a sour hydrocarbon distillate free from hydrogen sulfide, oxygen and oxygen gum and containing mercaptans, acids stronger than mercaptans and gum forming components, by extracting with a circulating alkali metal hydroxide solution containing an effective amount of a solutizer for mercaptans, whereby a spent solutizer solution is produced which is continuously regenerated and returned to said extraction, the improvement comprising treating said hydrocarbon distillate with a deaerated alkaline aqueous solution to remove said stronger acids, and contacting the resulting treated distillate which is still free from oxygen and oxygen gum with said alkali metal hydroxide solution containing said solutizer.

LAWRENCE L. LOVELL.
ARTHUR E. MARTIN.
FRANCIS W. BELL.